(12) United States Patent
Bhat et al.

(10) Patent No.: US 10,929,268 B2
(45) Date of Patent: Feb. 23, 2021

(54) LEARNING BASED METRICS PREDICTION FOR SOFTWARE DEVELOPMENT

(71) Applicant: Accenture Global Solutions Limited, Dublin (IE)

(72) Inventors: Sandeep Bhat, Pleasanton, CA (US); Rohit Shrikant Patwardhan, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 163 days.

(21) Appl. No.: 16/178,197

(22) Filed: Nov. 1, 2018

(65) Prior Publication Data

US 2020/0097388 A1    Mar. 26, 2020

(30) Foreign Application Priority Data

Sep. 26, 2018 (IN) .............................. 201811036338

(51) Int. Cl.
| | | |
|---|---|---|
| *G06F 11/00* | (2006.01) | |
| *G06F 11/36* | (2006.01) | |
| *G06K 9/62* | (2006.01) | |
| *G06F 17/18* | (2006.01) | |
| *G06N 20/00* | (2019.01) | |

(52) U.S. Cl.
CPC ...... *G06F 11/3616* (2013.01); *G06F 11/3608* (2013.01); *G06F 17/18* (2013.01); *G06K 9/6269* (2013.01); *G06N 20/00* (2019.01)

(58) Field of Classification Search
CPC ............. G06F 11/3447; G06F 11/3452; G06F 11/3608; G06F 11/3616
See application file for complete search history.

(56) References Cited

U.S. PATENT DOCUMENTS

| | | | | |
|---|---|---|---|---|
| 7,607,046 | B1 * | 10/2009 | Bruckhaus | G06F 11/008 702/185 |
| 7,856,616 | B2 * | 12/2010 | Chang | G06Q 10/00 714/37 |
| 8,881,095 | B1 * | 11/2014 | Hunt, Jr. | G06F 11/3688 705/7.13 |
| 9,619,363 | B1 * | 4/2017 | Chitale | G06F 11/3692 |
| 10,175,979 | B1 * | 1/2019 | Elwell | G06F 8/71 |
| 10,359,997 | B2 * | 7/2019 | Dunne | G06F 8/70 |
| 10,552,760 | B2 * | 2/2020 | Cmielowski | G06Q 10/101 |

(Continued)

*Primary Examiner* — Elmira Mehrmanesh
(74) *Attorney, Agent, or Firm* — Fish & Richardson P.C.

(57) ABSTRACT

Techniques are described for generating prediction metrics that describe one or more predicted characteristics and/or outcomes of a software development project. Implementations employ machine learning (ML) algorithms to develop prediction models to predict characteristics of a project. For example, the models can be employed to predict a number of defects that may be present in a software product that is produced by a software development project. A model can be trained using input data captured from previous software projects, such as data describing the feature set of a software product, the timeline for its development, the particular type or domain of software, a number of modules, functions, etc., the particular number and/or identity of personnel working on the project, and so forth. Such input data can be analyzed to extract features that are provided as training data to train a model that is used to predict project metrics.

20 Claims, 17 Drawing Sheets

(56) References Cited

U.S. PATENT DOCUMENTS

| | | | |
|---|---|---|---|
| 2013/0311968 A1* | 11/2013 | Sharma | G06F 11/3692 |
| | | | 717/101 |
| 2016/0307133 A1* | 10/2016 | Kour | G06Q 10/06313 |
| 2017/0178019 A1* | 6/2017 | Duggan | G06N 20/00 |
| 2017/0235569 A1* | 8/2017 | Sturtevant | G06Q 40/12 |
| | | | 717/102 |
| 2017/0364352 A1* | 12/2017 | Cmielowski | G06N 20/10 |
| 2018/0150742 A1* | 5/2018 | Woulfe | G06F 11/008 |
| 2018/0267886 A1* | 9/2018 | Durga | G06F 11/3604 |
| 2019/0095756 A1* | 3/2019 | Agrawal | G06N 3/08 |
| 2019/0102277 A1* | 4/2019 | Walenstein | G06N 20/20 |
| 2019/0138731 A1* | 5/2019 | Tan | G06F 21/577 |
| 2019/0155722 A1* | 5/2019 | Gupta | G06F 11/3624 |
| 2020/0057858 A1* | 2/2020 | Sharma | G06F 21/577 |

* cited by examiner

LEARNING BASED METRICS PREDICTION FOR SOFTWARE DEVELOPMENT

CROSS-REFERENCE TO RELATED APPLICATIONS

This application claims priority from Indian Provisional Application No. 201811036338, filed Sep. 26, 2018. The contents of the prior application are incorporated herein by reference in their entirety.

BACKGROUND

Businesses or other organizations that develop computer software strive to release software products that exhibit a high quality. For example, a software development team may strive to minimize or at least quantify the number of defects in the released software, and ensure that such defects as may be present do not impact the performance, functionality, and usability of the software product beyond a tolerable degree. Traditionally, software development teams have employed best practices with respect to design, coding, integration, build, testing, and deployment, to try and ensure a high quality release.

SUMMARY

Implementations of the present disclosure are generally directed to predicting project outcomes. More particularly, implementations of the present disclosure are directed to using a machine learning-trained model to predict metrics that describe characteristics of a software development project.

In general, implementations of innovative aspects of the subject matter described in this specification can be embodied in a method that includes the following operations: receiving input data that describes a plurality of prior software development projects; analyzing the input data to extract a plurality of features that characterize each of the prior software development projects, wherein the plurality of features for a respective prior software development project includes a feature indicating a number of defects present, at release time, in respective software produced through the respective prior software development project; providing the plurality of features as training data to train, using at least one machine learning (ML) algorithm, a model that predicts the number of defects based on one or more input features; employing the model to predict the number of defects present, at release time, in software produced through a subsequent software development project; and providing prediction information for presentation through a user interface, the prediction information including the predicted number of defects.

These and other implementations can each optionally include one or more of the following innovative aspects: the plurality of features for a software development project includes one or more of a number of requirements for the software produced through the software development project, a complexity of each of the requirements, a number of lines of code for the software, a code quality for the code, a number of modules in the software, a number of pages in the software, a number of functions in the software, and a skill index for one or more developers on the software development project; the at least one ML algorithm includes one or more of a regression algorithm, a time series algorithm, an autoregressive integrated moving average (ARIMA) algorithm, a support vector machine (SVM) algorithm, and a deep learning algorithm; the operations further include evaluating the model through k-fold evaluation; the input data describes at least one prior software development project to develop a previous version of software to be produced through the subsequent software development project; and/or the operations further include retraining the model using the at least one ML algorithm, based on additional input data that describes at least one other software development project.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
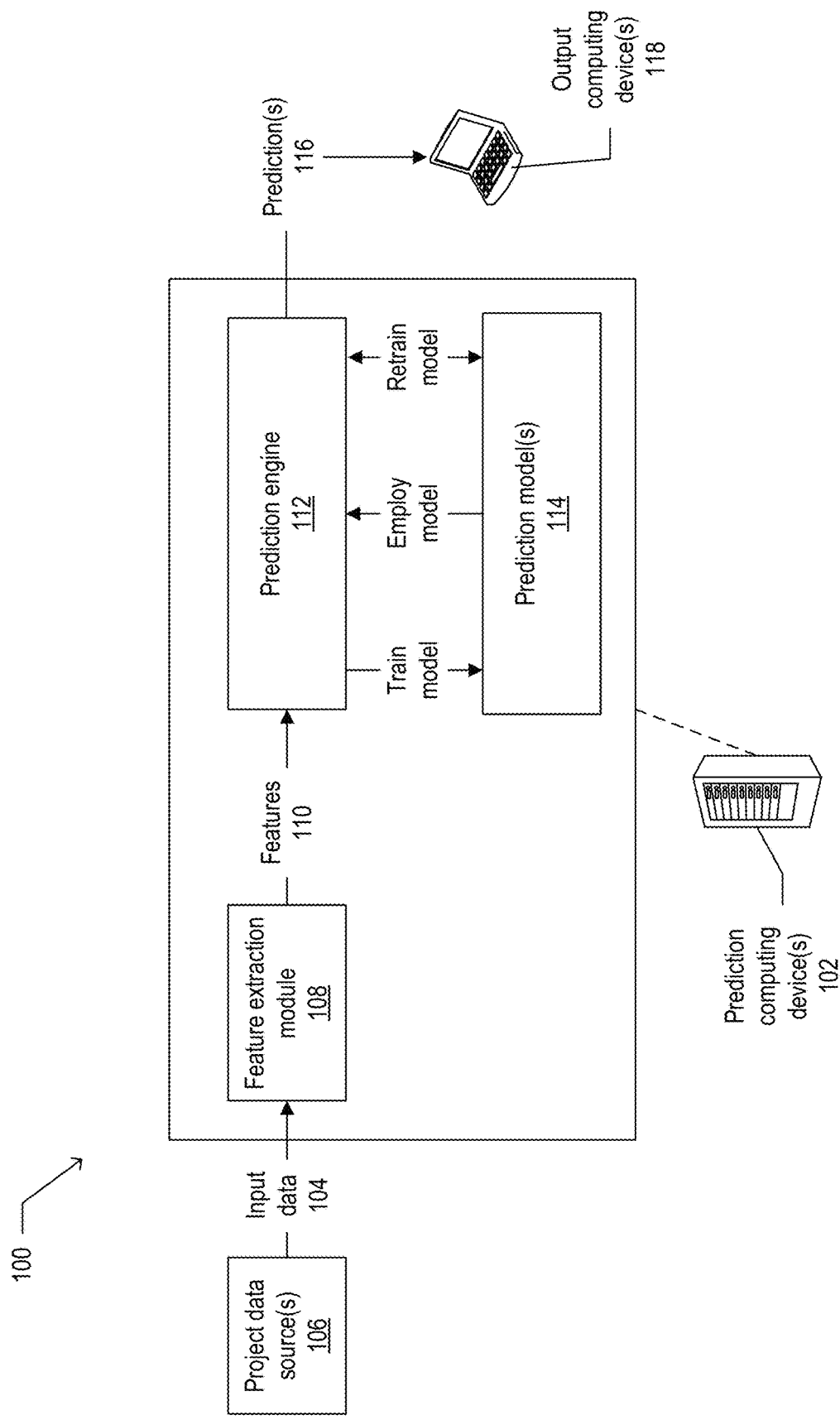
FIG. 1 depicts an example system for metrics prediction, according to implementations of the present disclosure.

Implementations of the present disclosure are directed to techniques for generating prediction metrics that describe one or more predicted characteristics and/or outcomes of a software development project. Implementations employ machine learning (ML) algorithms to develop prediction models, which may be used to predict characteristics of a software development project. For example, the predictions models (also referred to herein as models) can be employed to predict a number of defects that may be present in a software product that is produced by a software development project. A model can be trained or otherwise developed using input data that is captured from previous software projects. For example, the input data can include information regarding the feature set of a software product, the timeline for its development, the particular type or domain of software, a number of modules, objects, functions, pages, screens, or other features, the particular number and/or identity of software engineers (e.g., testers, coders, architects, etc.) working on the project, and so forth. Such input data can be analyzed to extract features from the input data. The features can be provided as training data to train a model that is used to predict certain metrics regarding a software development project. Examples of the input data, features, and output predictions are provided below. The model can be used to generate predictions regarding a software development project that is planned in the future and/or that is currently ongoing, and such predictions can be employed to help project managers or others adjust the development project to achieve a desired result (e.g., fewer defects, faster release time, etc.).

Any appropriate ML algorithm(s) can be used to train or otherwise develop the prediction model(s). In some examples, the model(s) can be self-learning and may be refined through retraining based on subsequently received input data describing the characteristics and outcomes of subsequent software development projects.

In some implementations, a user interface (UI), also referred to as a dashboard, can be provided to enable users to apply various ML-developed model(s) to generate predictions regarding software development projects. The dashboard can provide a set of tools to help users leverage sophisticated ML techniques to generate predictions or other insights regarding projects, even in examples where the users may lack particular knowledge and/or expertise regarding ML techniques.

At the model training phase, the dashboard can enable a user to specify certain goals to be achieved, and/or predictions to be made, regarding a software development project, such as release performance, number of defects, and so forth. The dashboard can be used to select and import input data regarding previous software development projects, the input data being in any suitable format (e.g., flat file, comma-separated values (CSV), relational database records, etc.). The dashboard can be used to select a model to be trained or otherwise generated based on the input data, and/or the ML techniques that may be employed to train the model. Feature extraction can be performed on the input data, as facilitated by the dashboard, and the dashboard can display a summary of extracted features. Trained models can be stored and made available for future use in generating predictions.

At the model usage phase, the dashboard can present a collection of previously trained models that are available to use for generating predictions. The user can employ the dashboard to select a model, and select the particular set(s) of input data to feed to the model. The model can be applied to the input data, and the predictions generated by the model can be displayed through the dashboard. The dashboard can also be used to specify other modes of presentation of the prediction results. For example, a user can specify individuals to whom prediction results are to be communicated via email or otherwise. In this way, results can be exported to development personnel, a test team, project management, and/or others to provide insights into a software development project. In some implementations, the dashboard can indicate for each available model the particular types of input data that are used to generate predictions through use of the model. In this way, implementations provide a data set template for use as input to a model for making subsequent predictions.

Implementations provide a ML (artificial intelligence) application for optimizing the software testing and development process, through the generation of accurate, data driven, ML-based insights and predictions for efficiently testing software products. Through use of the implementations described herein, a software development organization can deliver high quality software products in an intelligent and predictable manner. The prediction system described herein can readily integrate with other systems to continuously analyze data from multiple sources during the software development life cycle to enable data driven decisions. Implementations provide: a self-learning system that becomes smarter as it is applied over time, descriptive, predictive, and preventive analytics, built-in user management, security, and access control, data engineering, data analytics, and data visualization capabilities.

FIG. 1 depicts an example system 100 for metrics prediction, according to implementations of the present disclosure. As shown in this example, the system 100 can include one or more prediction computing devices 102, of any suitable number and type of computing device. The device(s) 102 (also described as the platform) can execute a prediction engine 112 and/or a feature extraction module 108. In some examples, the feature extraction module 108 can be a component of the prediction engine 112.

One or more project data sources 106 can be accessed (e.g., over network(s)) and provide input data 104 that describes one or more software development projects. The input data 104 can describe various characteristics of a software development project, as described further below. The input data 104 can be ingested to the platform and analyzed by a feature extraction module 108 that extracts one or more features 110 from each set of input data 104. The features 110 can be used by a prediction engine 112 to train prediction model 114 using any suitable ML techniques or algorithms. The model 114 can be stored on the platform or elsewhere and employed to generate predictions 116 based on other sets of input data 104, such as input data describing planned or ongoing software development projects. The model(s) 114 can be periodically retrained based on subsequently received input data 104, to further refine the model(s) 114 to generate more accurate and reliable predictions 116. The predictions 116 are also described herein as prediction metrics or predicted metrics, and can include characteristics and/or outcomes regarding a software development project. The predictions 116 can be communicated for presentation through a UI executing on an output computing device 118, which can be any suitable type of computing device.

The input data 104 can be received in any suitable volume and/or format, including flat files, CSV data, relational database records, key-value store records, hierarchical data, XML, JSON, or other metadata formats, and/or unstructured data.

Figure 2:
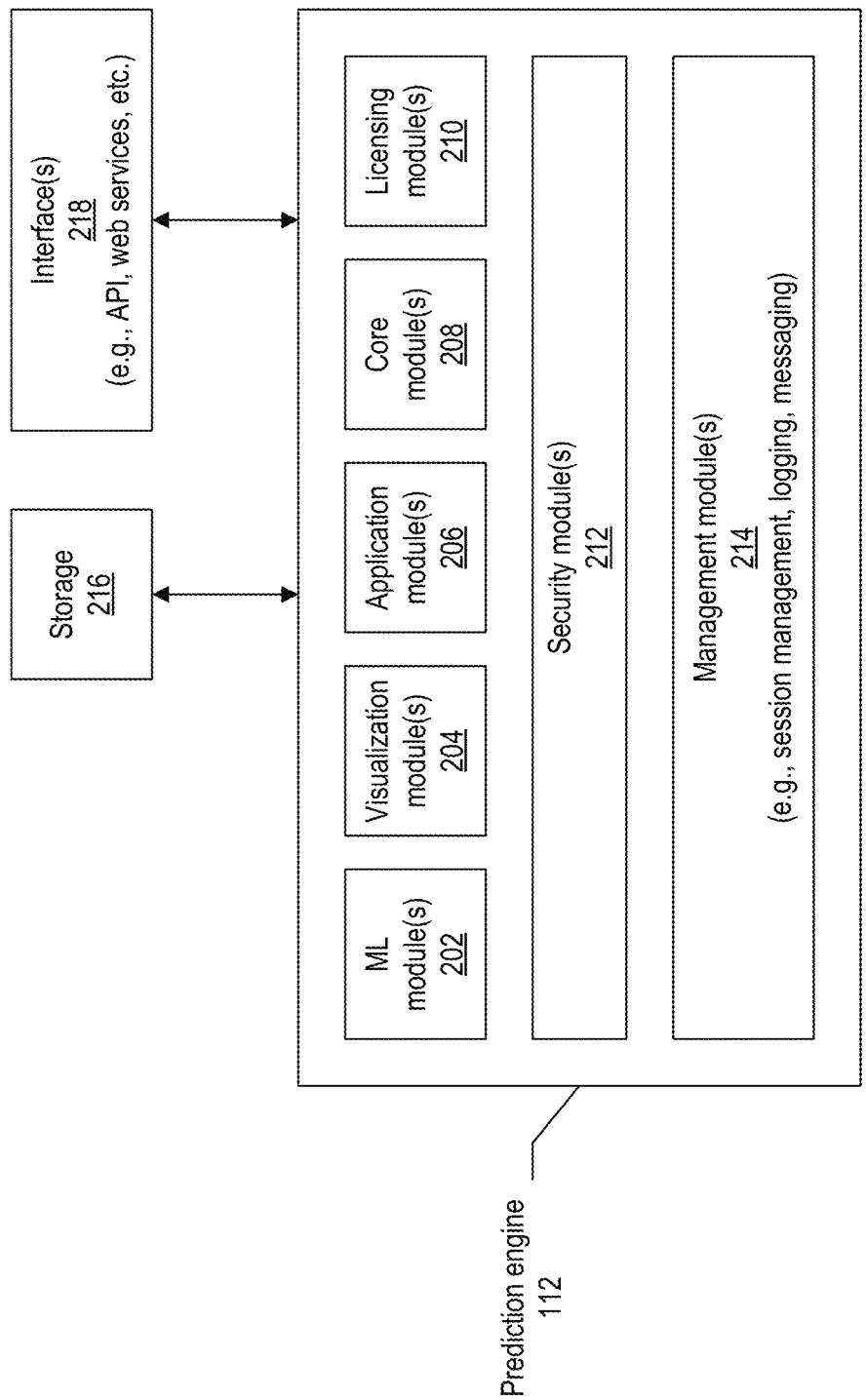
FIG. 2 depicts a schematic of an example prediction engine, according to implementations of the present disclosure.

FIG. 2 depicts a more detailed schematic of an example prediction engine 112, according to implementations of the present disclosure. As shown in the example, the prediction engine 112 can include ML module(s) 202, visualization module(s) 204, application module(s) 206, core module(s) 208, licensing module(s) 210, security module(s) 212, and management module(s) 214. The ML module(s) 202 can apply any suitable ML techniques and/or algorithms to train and retrain the model(s), and can include a script executor. The visualization module(s) 204 can include widgets, dashboards, collection, and/or other suitable components to provide for the visualization of input data, predictions, model(s), and so forth. The application module(s) 206 can include support for artificial intelligence (AI) for testing, waterfall, agile, and/or other suitable development paradigms. The core module(s) 208 can provide features for project management and user permissions. The licensing module(s) 210 can provide support for seat licenses per instance of the platform, and/or other licensing paradigms. The security module(s) 212 can apply any suitable security methodology to secure access to the platform and/or the information thereon, such as AES 128 bit encryption. The management module(s) 214 can provide support for session management (e.g., token based), logging (e.g., through logback), messaging (e.g., through nodejs, sockjs, etc.), and so forth.

The engine 112 can access storage 216 that may be a component of the platform and/or external to the platform. The storage 216 can include relational database(s) using any suitable relational database management system (RDBMS) (e.g., MySQL). The storage 216 can also include a repository such as a disk, file system (e.g., HDFS), database, and so forth. The engine 112 can also access interface(s) 218, such as application programming interface(s) (API(s)), UI(s) (e.g., web interfaces), and so forth. In some examples, the interface(s) 218 can include REST interface(s) and/or web services. The interface(s) can be employed to present prediction information and/or other data to user(s) and/or other processes (e.g., bots). For example, the platform may include a web server (e.g., Apache Tomcat) that presented information through a web interface, using any suitable technologies (e.g., HTML5, CSS3, Bootstrap, JQuery, AngularJS, JavaScript, etc.).

Project data sources 106 can include, but are not limited to: test management systems, service and/or incident management systems, people and/or time management systems, code analysis systems, continuous integration systems, market sentiment systems, and so forth. The prediction metrics can include analytics that are useful for various scenarios, including but not limited to: release performance, optimize risk-based testing, root cause analysis, predictive and deep analysis, detect bottlenecks, improve quality, process mining, market value, and so forth.

In some implementations, the platform can provide a hierarchical component architecture. For example, the ingested input data can be shared across projects, models, and dashboards. The models can be shared across projects, dashboards, and can be inclusive of multiple ingestions of input data. The dashboards can be shared across projects, and can be inclusive of multiple ingestions and/or multiple models. The platform can facilitate management and sharing of information for software development projects (e.g., AI for testing), and can be used to create private and/or public projects, add members to projects, assign permissions to individual entities, and so forth. A project can include ingestions, models, dashboards, and/or users. A user can use the platform to create and share projects, models, ingestions, and/or dashboards.

Figure 3:
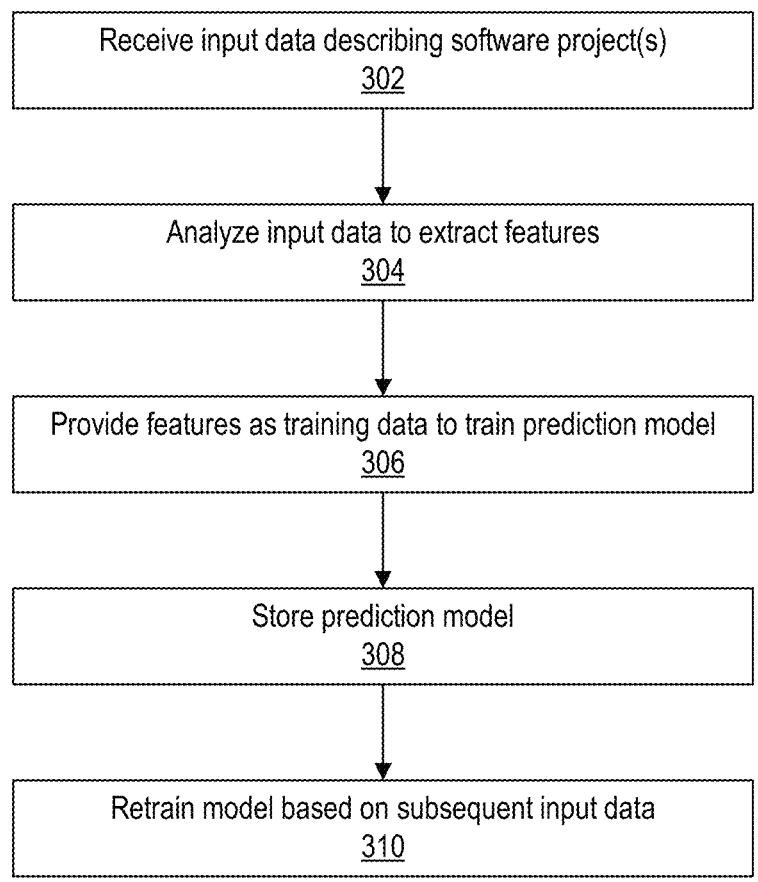
FIG. 3 depicts a flow diagram of an example process for model generation, according to implementations of the present disclosure.

FIG. 3 depicts a flow diagram of an example process for model generation (e.g., training), according to implementations of the present disclosure. Operations of the process can be performed by one or more of the feature extraction module 108, the prediction engine 112, sub-module(s) of the prediction engine 112, and/or other software module(s) executing on the prediction computing device(s) 102, the output computing device(s) 118, or elsewhere.

Input data describing one or more previous software development projects can be received (302). The input data can be analyzed (304) to extract features that describe characteristics and/or outcomes of each of the projects. A feature set can be determined, from the input data, for each project. The features can be provided as training data to train (306) a prediction model, which can be stored (308) for later use in generating predictions. In some instances, the model can be retrained (e.g., refined) based on subsequently received input data regarding projects, such that the model is improved to generate more accurate and reliable predictions.

Figure 4:
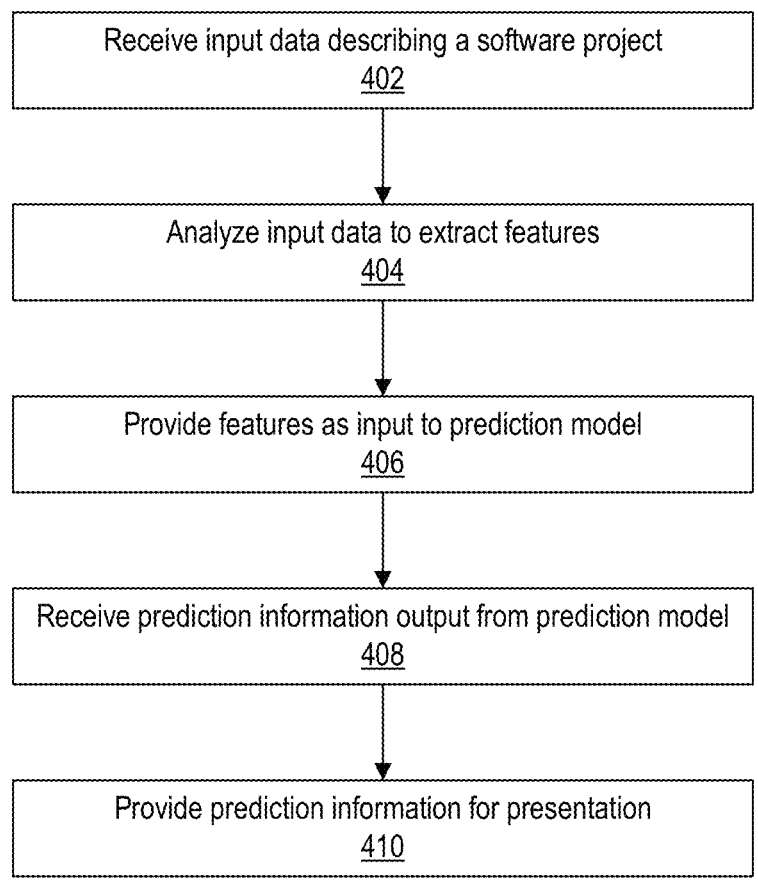
FIG. 4 depicts a flow diagram of an example process for metrics prediction, according to implementations of the present disclosure.

FIG. 4 depicts a flow diagram of an example process for metrics prediction, according to implementations of the present disclosure. Operations of the process can be performed by one or more of the feature extraction module 108, the prediction engine 112, sub-module(s) of the prediction engine 112, and/or other software module(s) executing on the prediction computing device(s) 102, the output computing device(s) 118, or elsewhere.

The input data described a software development project is received (402) and analyzed to extract features (404). The features can be provided as input to a previously trained prediction model (406), and the prediction information generated by the model as output can be received (408). The prediction information can be provided for presentation (410) and/or stored for later use.

In some implementations, particular action(s) are performed automatically in response to the generation of the prediction information and/or based on the particular predictions (predicted metrics) that are generated by the model(s). For example, the prediction information can be automatically provided as input to a testing framework that controls automated testing of the software produced by the software development project. Such a testing framework may operate as part of a build process to automatically test one or more built software modules. In instances where the prediction information includes a test bucket (e.g., a collection of tests to be executed against the software), the tests in the test bucket may be executed automatically after the test bucket is generated by the model(s). In some examples, the tests can be run automatically based on the order of priority or criticality (e.g., risk level) that is predicted for each test. In instances where the prediction information includes a predicted number of defects, the particular tests to be run automatically, the number of tests to be run, the duration of the automated testing to be performed, and/or other testing aspects may be determined automatically based on the predicted number of defects. For example, if the prediction information predicts that there will be N defects in the software, and less than N defects are found during a typical testing pass after a predetermined period of testing time, the automated system may run additional tests, and/or run the tests for a longer period of time, until at least the predicted number of defects are identified in the software. As another example, in instances where the prediction information includes predicted number of defects introduced by each developer, the automated testing may be adjusted based on predicted defects for each developer. For example, a greater number and/or different set of tests may be automatically run to test code that is checked in by a developer with a higher predicted rate of introduced defects compared to other developers. In such examples, the prediction information is employed as control information to control automated testing in a manner that provides a concrete, consistently reproducible technical result of the testing and software development process, more efficient automated testing, and/or other technical advantages.

In some implementations, the input data includes technical information regarding the software being developed, such as the type of software, number of functions, modules, pages, classes, interfaces, etc. in the software, and/or other types of technical information that describes (e.g., defines) the software under development.

Implementations support the training of models to generate predictions associated with various metrics for software development projects, including but not limited to the following: release performance, developer performance, tester performance, requirements analysis, test case prediction, test case optimization (e.g., risk-based testing), codebase coverage, two-in-a-box (e.g., developer-tester combinations), environment analysis, what-if analysis, sentiment analysis, and AI for testing. Each of these examples is described further below.

Release Performance

In this scenario, input data can include: requirements (e.g., code changes, software features added), development, test cases, defects, and so forth.

Features extracted can include (e.g., for each software product release): number of requirements, number of test cases, lines of code, average complexity of requirements, developer skill index, code quality (e.g., security analysis, coding practices used, etc.), number of modules, pages, functions, features, and/or lines of code, number of defects, and so forth. Certain features can be further refined, to determine for example a number of critical requirements, number of critical defects, and so forth.

The ML algorithms applied to train a model can include: regression/time series (ARIMA), linear regression, SVM, deep learning, etc. If a limited quantity of input data is available, ARIMA and/or other time series algorithms can be employed.

The output predictions can include: a number of defects predicted for a future release.

In this scenario, implementations provide the following benefits: better planning, product quality improvement, and/or less defect leakage. In some examples, input data from at least ten past releases is sufficient to train the model and begin prediction. If limited data is available for previous versions of the project that is the target of prediction, the platform can use data from projects that are similar to the project that is the target of prediction. In some instances, if limited data is available, linear regression techniques can initially be employed.

For release performance prediction, requirements, development, test cases, and defects data can be ingested. The data can be prepared and/or exported from other systems and/or applications in a templated format. Upon data ingestion, features are extracted (e.g., calculated or summarized). After feature preparation, a model is trained, e.g., using the regression algorithms. Once the ML model is trained and evaluated (e.g., using a k-fold method), the model is used for prediction, in some examples along with hyper-parameterization.

Model enrichment can also happen in the background without user intervention, to retrain the model in response to additional data being imported into the platform. Model enrichment can automatically create a new version of the model and check the model accuracy. The version with the best accuracy can then be used for prediction. In some examples, new data is automatically prepared from updated data points and passed to the model for prediction. A number of defects can be predicted for a future software release.

Requirements, test cases, and/or defects data can be exported form HP QA, HP ALM, HP Octane, TFS, SonarQube, Jira, Bugzilla, and/or other suitable applications. Table 1 below lists example requirements input data.

TABLE 1

| ID | PRODUCT | NAME | DATE | STATUS | TYPE | COMPLEXITY |
|---|---|---|---|---|---|---|
| 1 | Claim Center | Medicare Information Reporting | Dec. 20, 2016 | Not Covered | Functional | Medium |
| 2 | Claim Center | Instruct Rehabilitation Provider | Dec. 20, 2016 | Not Covered | Functional | Medium |
| 3 | Claim Center | 170_03_CC_BR_UPDATE TPVehicleDet | Dec. 20, 2016 | Failed | Functional | Simple |
| 4 | Claim Center | Capture Defense | Dec. 20, 2016 | Not Covered | Functional | Medium |
| 5 | Claim Center | Coverage Evaluation | Dec. 20, 2016 | Passed | Functional | Complex |

Table 2 below lists example development input data.

TABLE 2

| DEV ID | REQ ID | DEVELOPER | DEV LOC | DEV VIOLATION | DEV PAGE | COMPLEXITY |
|---|---|---|---|---|---|---|
| 1 | 3 | prasroy | 1725 | 7 | login_module_pages | function 1 |
| 2 | 5 | mswathi | 8000 | 9 | claim_processing | function 6 |
| 3 | 6 | mswathi | 5000 | 10 | claim_processing | function 6 |
| 4 | 7 | lalkumar | 6200 | 11 | reports | function 11 |
| 5 | 9 | sukuppus | 9500 | 9 | claim_calculations | function 15 |

Table 3 below lists example test cases input data.

TABLE 3

| TEST ID | REQ ID | DESCRIPTION | EXPECTATION | PRIORITY | OWNER |
|---|---|---|---|---|---|
| 1 | 2 | Description 1 | Expectation 1 | Critical | Allistir Dener |
| 2 | 1 | Description 2 | Expectation 2 | Critical | Allistir Dener |
| 3 | 3 | Description 3 | Expectation 3 | Critical | Allistir Dener |
| 4 | 5 | Description 4 | Expectation 4 | Critical | Leodora Feldhammer |

Table 4 below lists example defects input data.

TABLE 4

| ID | FIX TIME | DEV | CLOSING TIME STAMP | TESTER | PRI | SEV | ROOT CAUSE | TARGET FIX DATE |
|---|---|---|---|---|---|---|---|---|
| 1 | 2.16 | prasroy | Jan. 27, 2015 | Allistir Dener | Low | High | Not Reproducible | Jan. 27, 2017 |
| 1 | 1.52 | mswathi | Jan. 15, 2017 | Leodora Feldhammer | High | High | Test Data Issue | Jan. 15, 2017 |
| 1 | 3.75 | mswathi | Jan. 5, 2017 | Hieronymus Cumberpatch | High | Med | Environment Defect | Jan. 5, 2017 |
| 1 | 2.39 | lalkumar | Jan. 4, 2017 | Hieronymus Cumberpatch | High | High | Requirement Gap-Documentation | Jan. 4, 2017 |
| 1 | 5.47 | sukuppus | Jan. 27, 2017 | Hieronymus Cumberpatch | High | Low | Environmental Defect | Jan. 27, 2017 |

Table 5 below lists example extracted features.

TABLE 5

| ID | Total Loc | Total Reqs | Total Pages | Total Fnctns | Average Complexity | Code Quality | Total Defects | Total Test Cases | Skill Index |
|---|---|---|---|---|---|---|---|---|---|
| 1001 | 142030 | 12 | 5 | 12 | 1.65 | 40.7 | 10 | 49 | 2.9 |
| 1002 | 393172 | 33 | 5 | 14 | 1.850767 | 39.26137 | 6 | 49 | 3.1 |
| 1003 | 591477 | 30 | 5 | 13 | 1.665621 | 39.55318 | 7 | 49 | 1.9 |
| 1004 | 494177 | 24 | 4 | 12 | 2.272143 | 31.66495 | 8 | 49 | 2.2 |
| 1005 | 439814 | 30 | 6 | 14 | 1.260606 | 47.68485 | 10 | 49 | 2.4 |

For release performance, the ML algorithms can include one or more of regression (e.g., linear regression, SVM, decision tree, random forest, Knn, etc.) and/or time series (e.g., ARIMA). Table 6 below lists example summary output from a linear regression model.

TABLE 6

| Linear Regression |
|---|
| 7 samples |
| 9 predictors |
| Pre-processing: scaled (9), centered (9) |
| Resampling: Cross-Validated (10 fold, repeated 3 times) |

TABLE 6-continued

| Linear Regression |
|---|
| Summary of sample sizes: 6, 6, 6, 6, 6, 6, . . . |
| Resampling results: |
| RMSE |
| 45.66813 |
| Tuning parameter 'intercept' was held constant at a value of TRUE |

The output predictions in this scenario can include the number of defects predicted for future releases. Table 7 below lists an example of predicted number of defects.

TABLE 7

| ID | Total Loc | Total Reqs | Total Pages | Total Fnctns | Average Complexity | Code Quality | Total Test Cases | Skill Index | Total Defects |
|---|---|---|---|---|---|---|---|---|---|
| 1008 | 399250 | 46 | 6 | 6 | 1.848168 | 50.33709 | 127 | 1.8 | 144.78 |

Figure 6:
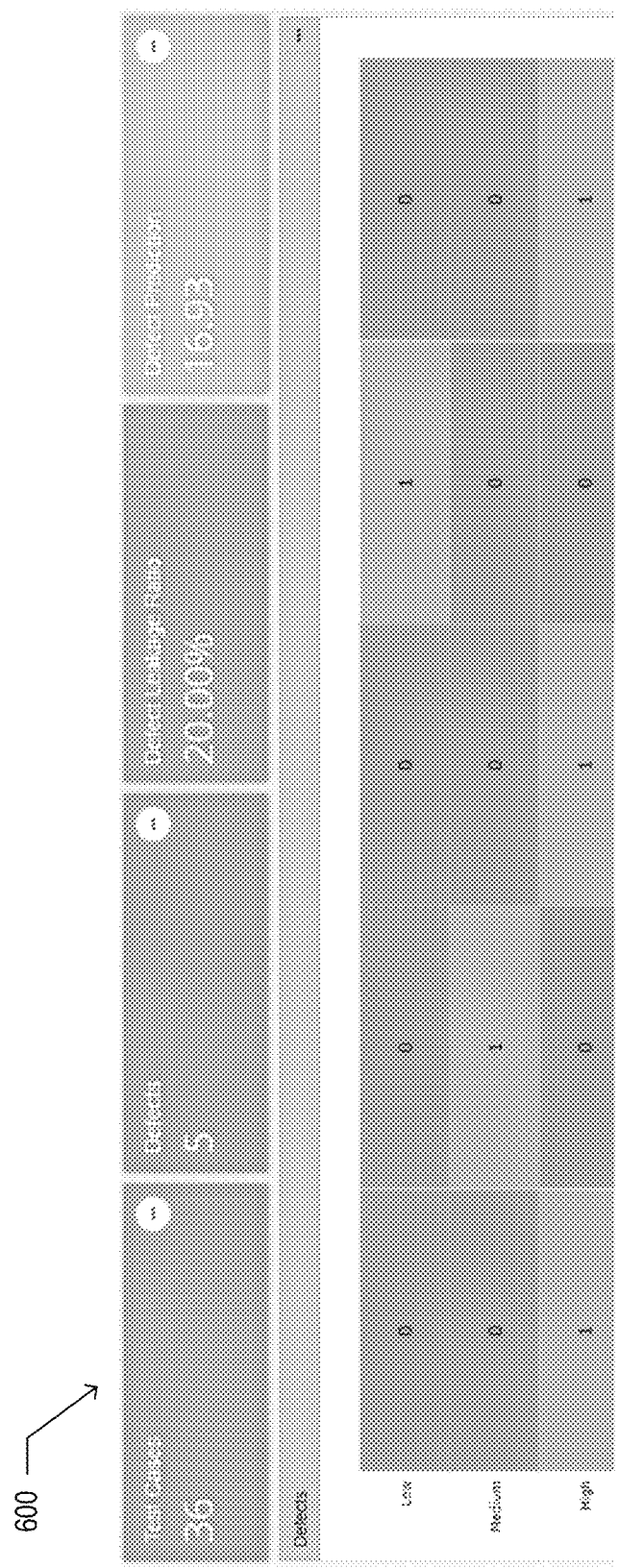
FIGS. 6-17 depict example user interfaces, according to implementations of the present disclosure.

FIG. 6 shows an example of prediction information for release performance, presented in an example UI 600.

Developer Performance

In this scenario, input data can include: requirements (e.g., requirements for the software release), development, and/or defects.

Features extracted can include (for each developer): average complexity (e.g., of software requirements), lines of code, code quality, number of requirements, number of defects, average defect fix time variance, number of modules and/or pages, number of functions, and/or particular developer(s) involved.

The ML algorithms applied to train a model can include: regression, e.g., linear regression, SVM, decision tree, random forest, and/or Knn.

The output predictions can include: a number of defects predicted for each developer for the future release.

In this scenario, implementations may provide the following benefits: resource optimization, and/or efficiency gain.

Using the ingested data, feature extraction is performed. The data may be further summarized for each developer for each release. The following features can be extracted: total lines of code, number of requirements, total pages, functions, and/or modules, average complexity of requirements, code quality in terms of security standards, coding standards, etc., average defect fix time variance, and/or number of defects. Number of defects may be predicted for upcoming release. Benefits of developer performance prediction may include resource optimization, efficiency gain, and/or better planning.

Figure 7:
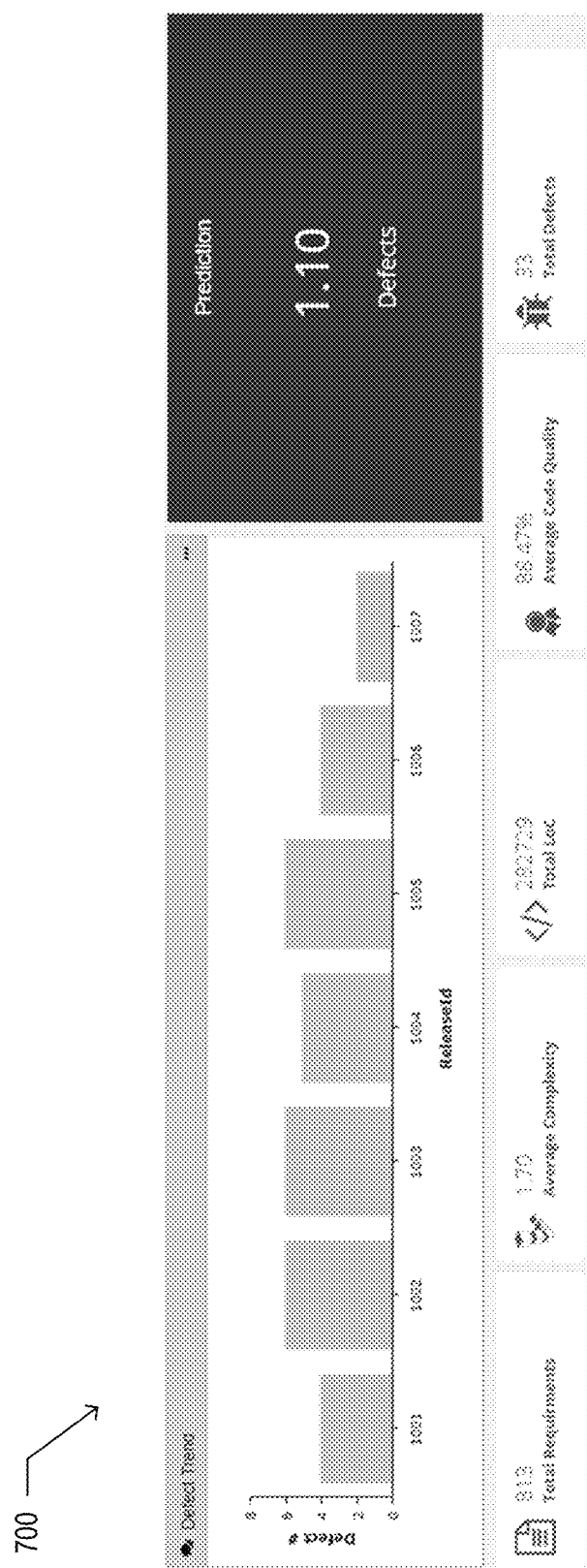

FIG. 7 shows an example of prediction information for developer performance, presented in an example UI 700.

Tester Performance

In this scenario, input data can include: requirements, test cases, test case execution, and/or defects.

Features extracted can include (for each tester): number of requirements, number of test cases, average complexity, average priority, historical defect leakage ratio (DLR), particular tester(s) involved.

The ML algorithms applied to train a model can include: regression, e.g., linear regression, SVM, decision tree, random forest, Knn, etc.

The output predictions can include: a DLR prediction for each tester for the future release.

In this scenario, implementations may provide the following benefits: resource optimization, efficiency gain, better planning, and/or early quality indicator.

Using the ingested data, feature extraction is performed. The data may be further summarized for each tester for each release. The following features may be extracted: number of test cases, number of requirements, average complexity of requirements, average priority of test cases, and/or historical DLR. A future DLR can be predicted for the upcoming release for each tester. Benefits of tester performance prediction can include resource optimization, efficiency gain, better planning, and/or early quality indicator.

Figure 8:
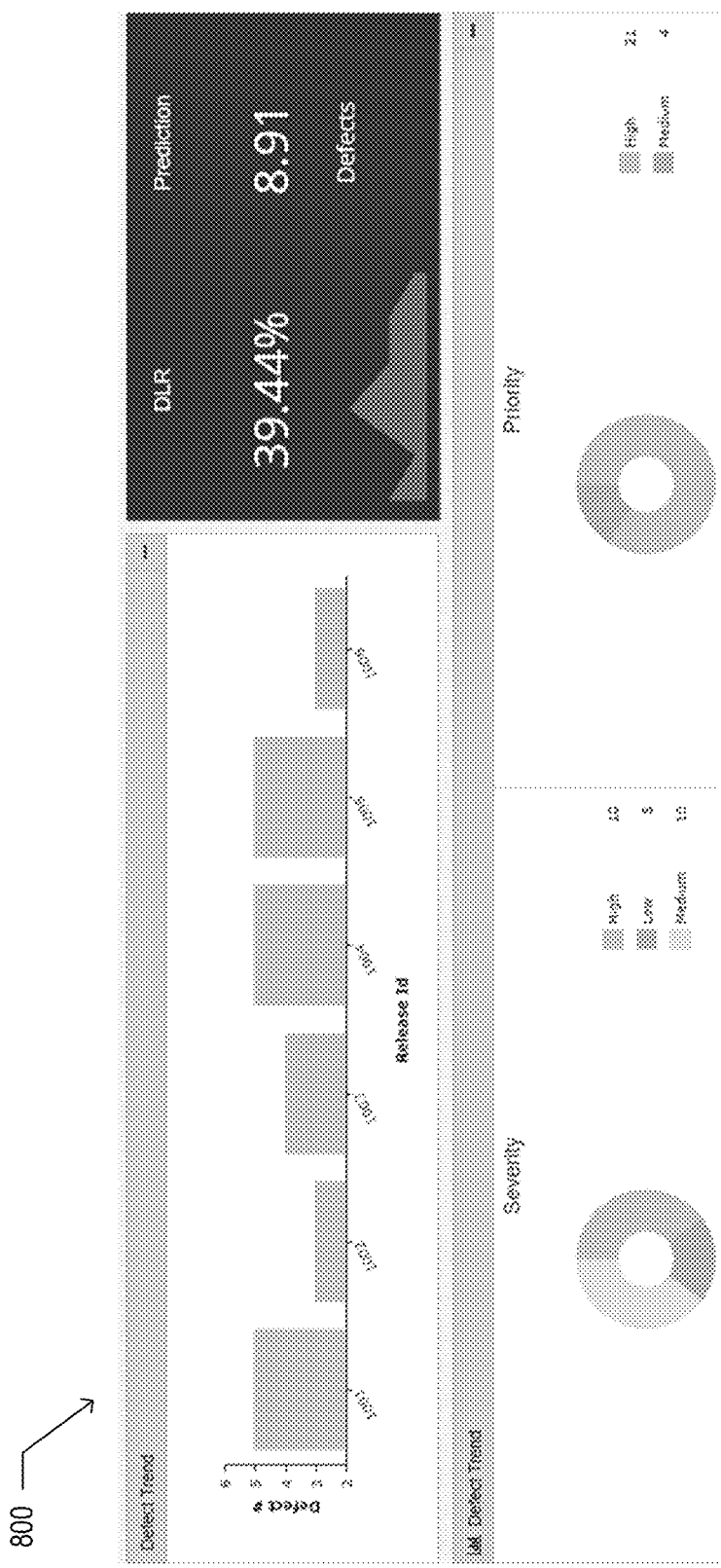

FIG. 8 shows an example of prediction information for tester performance, presented in an example UI 800.

Requirements Analysis

In this scenario, input data can include: requirements, test cases, and/or development.

Features extracted can include (for each requirement): complexity of requirement, lines of code, code quality, average priority, number of test cases, developer skill index, requirement type, and/or status.

The ML algorithms applied to train a model can include: classification, e.g., logistic, SVM, Knn, naïve Bayes, decision tree, random forest, linear discriminant analysis (LDA), and/or bagged classification and regression tree (CART).

The output predictions can include: a status (e.g., pass or fail) prediction for each requirement.

In this scenario, implementations may provide the following benefits: better release planning, and/or timely delivery.

Using the ingested data, feature extraction is performed. The data may be further summarized for each of the requirements. The following features may be extracted: requirement complexity, requirement type (e.g., functional, non-functional, etc.), number of lines of code, total number of test cases covering the requirement, average priority of test cases covering the requirement, and/or requirement status. A requirement status (e.g., pass or fail) may be predicted for the upcoming release for each requirement. Benefits of requirements analysis can include early quality indicator, and/or better planning. This prediction may also act as an input for test case prediction and test cases optimization, for risk-based testing.

Figure 9:
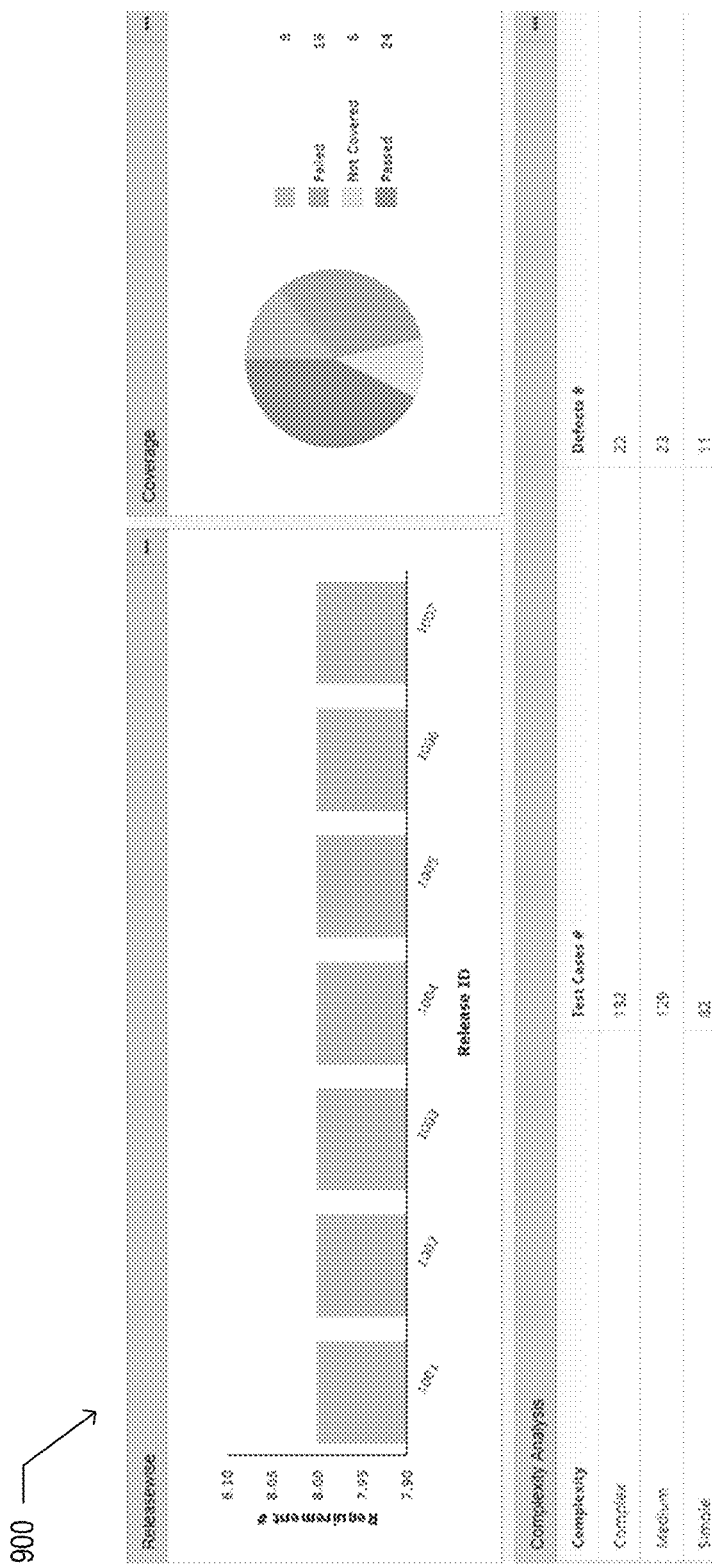

FIG. 9 shows an example of prediction information for requirements analysis, presented in an example UI 900.

Test Case Prediction

In this scenario, input data can include: requirements, development, test cases, and/or test execution.

Features extracted can include (for each test case): test case priority, requirement complexity, number of test case executions, number of times passed, number of times failed, most recent status, code quality, average developer(s) skill index, total lines of code, and/or status.

The ML algorithms applied to train a model can include: classification, e.g., logistic, SVM, Knn, naïve Bayes, decision tree, random forest, LDA, and/or bagged CART.

The output predictions can include: status (e.g., pass or fail) prediction for each test case.

In this scenario, implementations may provide the following benefits: less defect leakage, and/or better planning.

Using the ingested data, feature extraction may be performed. The data may be further summarized for each of the test cases. The following features can be extracted: test case priority, average complexity of mapped requirement(s), how many times test case is executed, how many times test case is passed, how many times test case failed, what was the most recent status, what is the code quality of the code covered by test case, average developer(s) skill index, total lines of code, test case status. The future test case status (e.g., pass or fail) can be predicted for the upcoming release for each test case. Benefits of test case prediction may include early defect detection, and/or better planning. This prediction may also act as an input for test case prediction and test cases optimization for risk-based testing.

Figure 10:
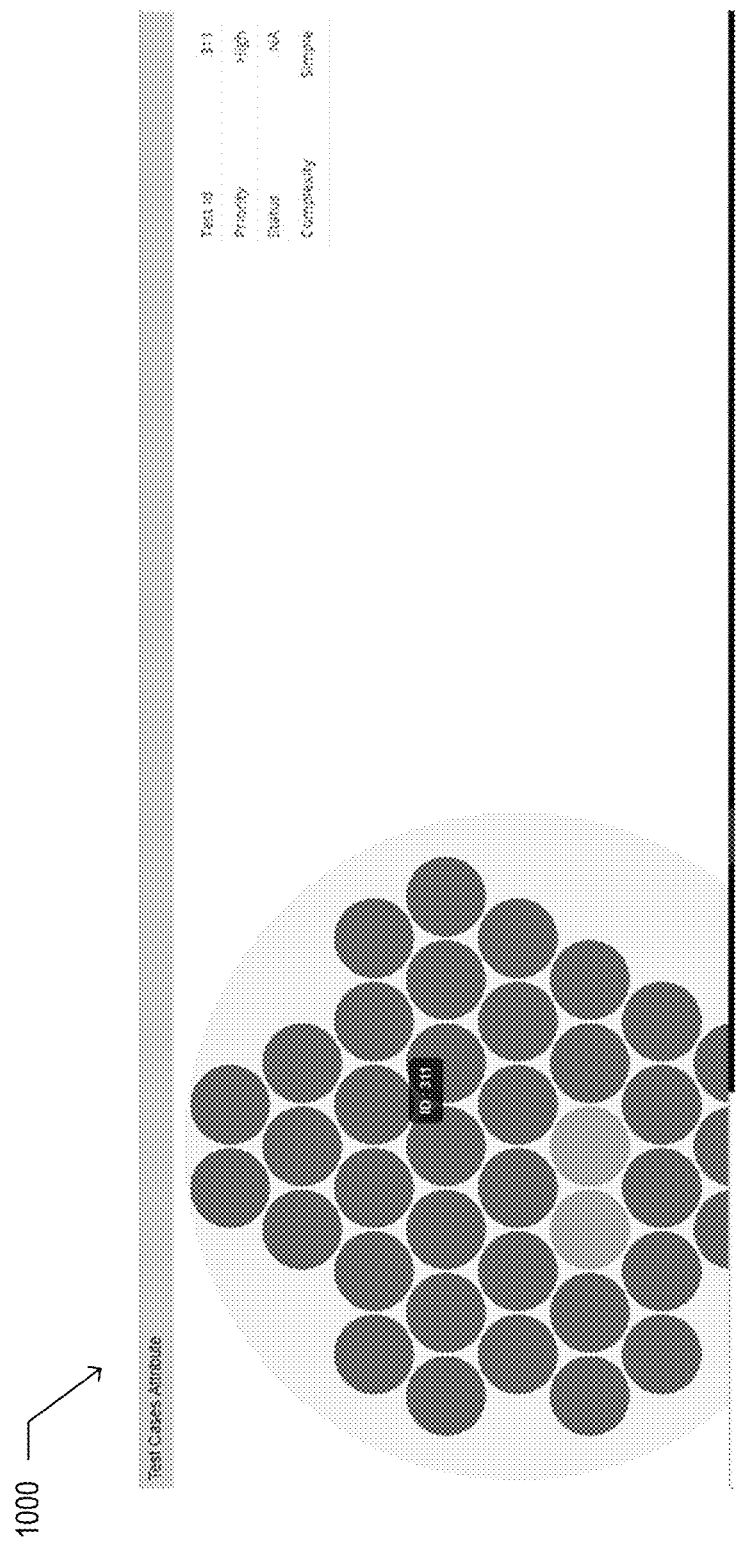

FIG. 10 shows an example of prediction information for test case prediction, presented in an example UI 1000.

Test Case Optimization (e.g., risk-based testing)

In this scenario, input data can include: test case status prediction, and/or requirements prediction.

Features extracted can include (for each test case): test case prediction, test case priority, and/or requirement complexity.

The ML algorithms applied to train a model can include: clustering, such as a K-means clustering model.

The output predictions can include: a test bucket creation for the future release.

In this scenario, implementations may provide the following benefits: decreased redundancy, and/or better planning.

Test case optimization may receive the input data automatically, and/or use as input the results of test case status prediction and/or requirements status prediction. Test case priority and requirement complexity may be mapped to each test case. After data preparation, a clustering algorithm (e.g., K-means) can be applied with hyper-parameterization. Model enrichment may also be performed in the background without user intervention, to retrain the model in response to additional data being imported into the platform. Model enrichment may automatically create a new version of the model and check the model accuracy. The version of the model with highest accuracy may then be used for prediction. A test bucket can be prepared by determining the test cases to be executed based on the selected risk level (e.g., low, medium, high). The test bucket can then be provided to the testing team. Risk-based testing may optimize test cases for each risk level (e.g., high, medium, low). For each risk level, a list of test cases along with a suggested tester may be prescribed. Benefits of test case optimization can include the optimization and/or prioritization of test cases to reduce redundant efforts, detect defects early in the development process, provide better planning, perform shift left in the project schedule, and so forth.

Figure 11:

FIG. 11 shows an example of prediction information for test case optimization, presented in an example UI 1100.

Codebase Coverage

In this scenario, input data can include: test case status prediction, requirements prediction, and/or development.

Features extracted can include: test case prediction, test case priority, and/or requirement complexity.

The ML algorithms applied to train a model can include: clustering, such as K-means clustering.

The output predictions can include: a test bucket creation based on codebase change.

In this scenario, implementations can provide the following benefits: perform shift left, better planning, timely delivery, and/or decrease redundancy.

Codebase coverage can shortlist the test cases to be executed based on the code changes. Code changes may be taken from the data generated by a code versioning application (e.g., TFS, Github, etc.). Once data is ingested, the requirements may be mapped to each code change, with a test case suite. With this mapping, descriptive analytics and/or a clustering algorithm (e.g., K-means) with hyper-parameterization may be used to shortlist the test cases. Model enrichment may also be performed in the background without user intervention, to retrain the model in response to additional data being imported into the platform. The model enrichment may also automatically create a new version of the model and check the model accuracy. The version with the best accuracy may then be used for prediction. Test bucket can be created which can be provided to the testing team. For codebase coverage; requirements and test cases prediction data may be used along with development data. Both requirements prediction and test cases prediction can be done by training the ML model using requirements, development, and/or test cases data. Requirements, test cases, and/or development data can be exported form HP QA, HP ALM, HP Octane, TFS, SonarQube, Github, and/or other suitable applications. Features extracted can include test case prediction, test case priority, and/or requirement complexity. For each of the modules and/or pages and its related function change, the mapped test cases along with its prediction may be considered for optimization. After feature preparation, a model can be trained using the clustering algorithms. Test case optimization may be performed based on the requirements and test cases prediction. Test case priority and requirement complexity and/or development data may be used along with the prediction for each requirement and test case. Codebase coverage optimizes test cases, and a suggested tester may be indicated.

Figure 12:
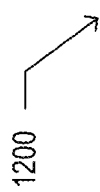

FIG. 12 shows an example of prediction information for codebase coverage, presented in an example UI 1200.

Two-in-a-box (e.g., developer-tester combinations)

In this scenario, input data can include: defects

Features extracted can include: the responsible developer(s) and/or tester(s), and/or defect fix time.

The ML algorithms applied to train a model can include: descriptive analytics.

The output predictions can include: developer and tester combinations.

In this scenario, implementations may provide the following benefits: enhanced productivity, and/or timely release. Two-in-a-box is a developer and tester combination that is designed to enhance the productivity and help in timely delivery. Defects data, which can be exported from a defects management application in templated format, may be ingested in the platform. Descriptive analytics can be used to create the developer and tester combinations using defect severity, defect status, estimated fix time, and/or actual fix time. Defects data used for this feature can be exported from applications such as HP QA, Jira, Bugzilla, etc. Defect severity, defect estimated, and actual fix time may be used as input data for this feature. Features extracted can include responsible developer, responsible tester, and/or defect fix time. From the defects data, for each of the responsible developers, an average fix time can be calculated. Once calculated, for each of the combinations of developer and tester, the effective productivity can be checked based on the average fix time and defect status. The responsible developer, tester, estimated defect fix time, and actual defect fix time features can be used to derive the predicted (e.g., optimal) two-in-a-box combination, indicating the best developer and tester combination based on the historical data. Descriptive analysis may be used to determine the best possible combinations of developer and tester based on the extracted or calculated features. This helps provide for better planning and to enhance productivity to achieve a timely release.

Figure 13:
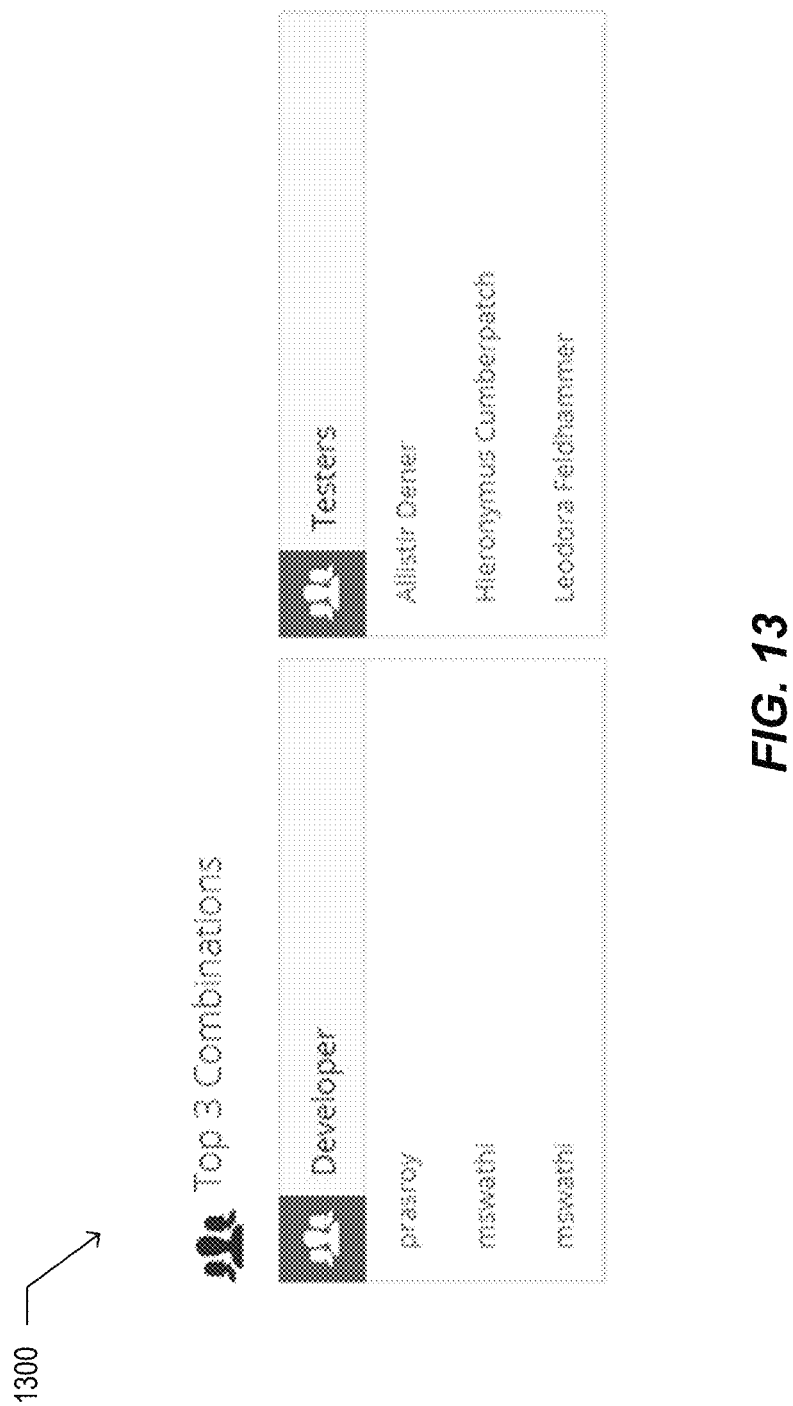

FIG. 13 shows an example of prediction information for two-in-a-box, presented in an example UI 1300.

Environment Analysis

In this scenario, input data can include: defects.

Features extracted can include: environment related defects, and/or defect retrospection.

The ML algorithms applied to train a model can include: descriptive analytics, and/or natural language processing (NLP).

The output predictions can include: actions to be taken for environment deployment.

In this scenario, implementations may provide the following benefits: timely delivery, and/or defects prevention.

Environment analysis helps a team to deploy the environment with an optimal configuration based on the historical incidents. Defects data which can be exported from a defects management application in templated format and ingested into the platform. Descriptive analytics and/or NLP can be used, to determine the actions on various parameters based on the historical data, such as QA retrospection of the defect. Reports and/or analysis of an incident management system can be used to enhance the suggestions. Defects data can be used for environment analysis. A defect retrospection feature may be used from defects data for environmental defects. The defects data can be exported from Jira, Bugzilla, HP QA, and/or other suitable applications. Features extracted can include environment related defects, and/or defect retrospection. From the defects data, the defects caused by the environment can be filtered and an NLP algorithm can be used on retrospection of the filtered defects. From retrospection, following parameters may be extracted: cause of defect (e.g., database, hardware, network, etc.), tuned parameters (e.g., log size, server, user load, bandwidth, etc.), value and action. Value may be the actual value of the parameter and action can be to increase a value, decrease a value, remove a value, etc. The NLP algorithm can be used to extract the following: a dragger (e.g., network, hardware, people, etc.), parameter (e.g., DB Lock, bandwidth, load balancer, server, etc.), action (e.g., increase or decrease), and/or value (e.g., an actual value for each of the parameters). Environment analysis can help to deploy the optimal environment, reducing defects caused due to environment and thus helping in timely delivery with better quality.

Figure 14:
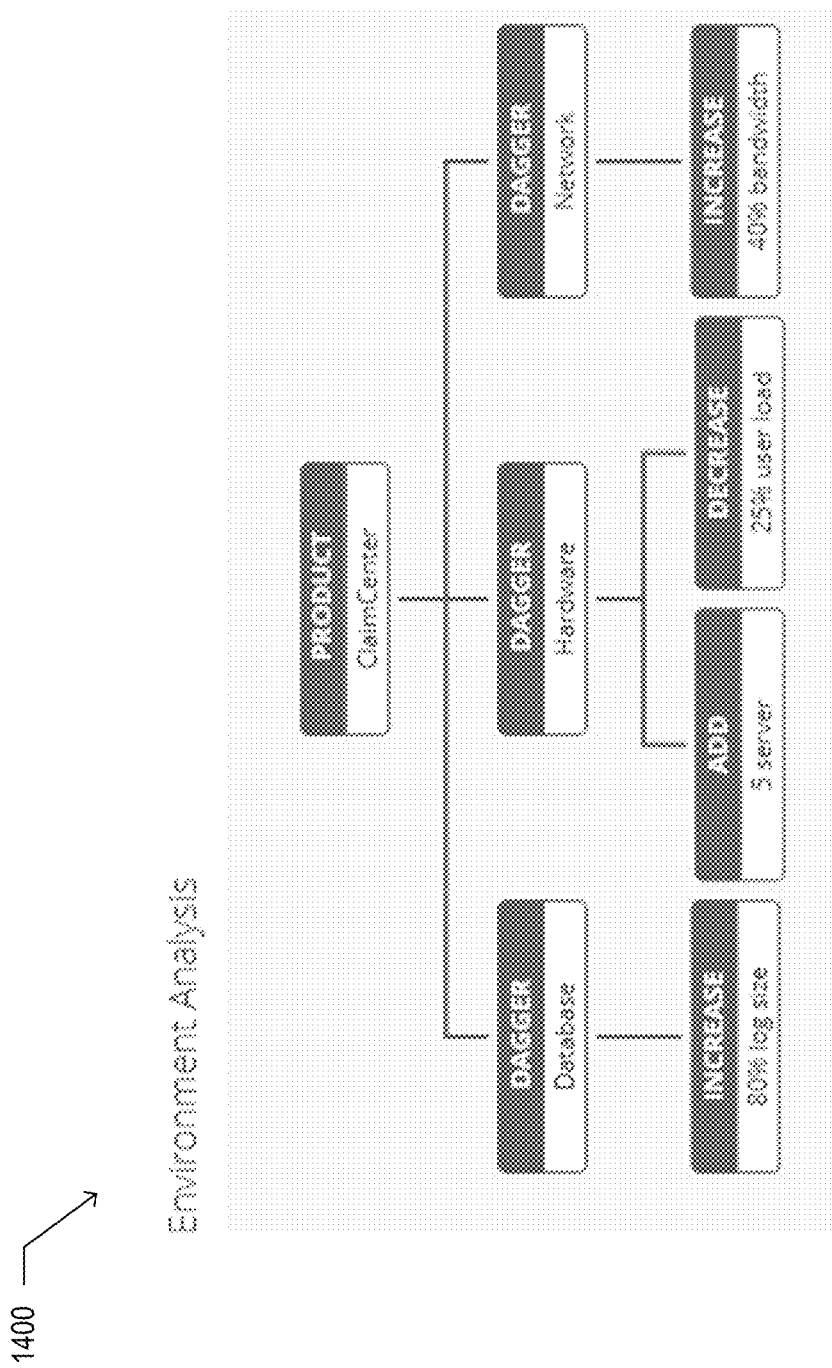

FIG. 14 shows an example of prediction information for environment analysis, presented in an example UI 1400.

What-if Analysis

In this scenario, input data can include: defects.

Features extracted can include: defects summary based on root cause.

The ML algorithms applied to train a model can include: descriptive analysis, and/or what-if.

The output predictions can include: a what-if simulation.

In this scenario, implementations can provide the following benefits: cycle time reduction, better planning, and/or early defect prevention.

The what-if analysis feature leverages users to simulate the defects caused by various root causes and see how they may affect quality and/or delivery. Defects data can be exported from a defects management application in templated format, and be ingested into the platform. Descriptive analytics and what-if analysis can be used to show the simulated numbers for test quality and delivery. Defects data can be used as input for environment analysis. The defect root cause feature may be used from the defects data. The defects data can be exported from Jira, Bugzilla, HP QA, and/or other suitable applications. In feature extraction, the defects data can be summarized based on the root cause of the defect. For example, root causes may include test data mismatch, environment, design, integration, and/or code. The defects data may be summarized for previous releases for each defect root cause. This summarized data may be further used for what-if analysis. Descriptive analysis and what-if analysis may be used on the summarized defects data. The user can see how increasing or decreasing the percentage of defects for each case may affect the testing quality and release time.

Figure 15:
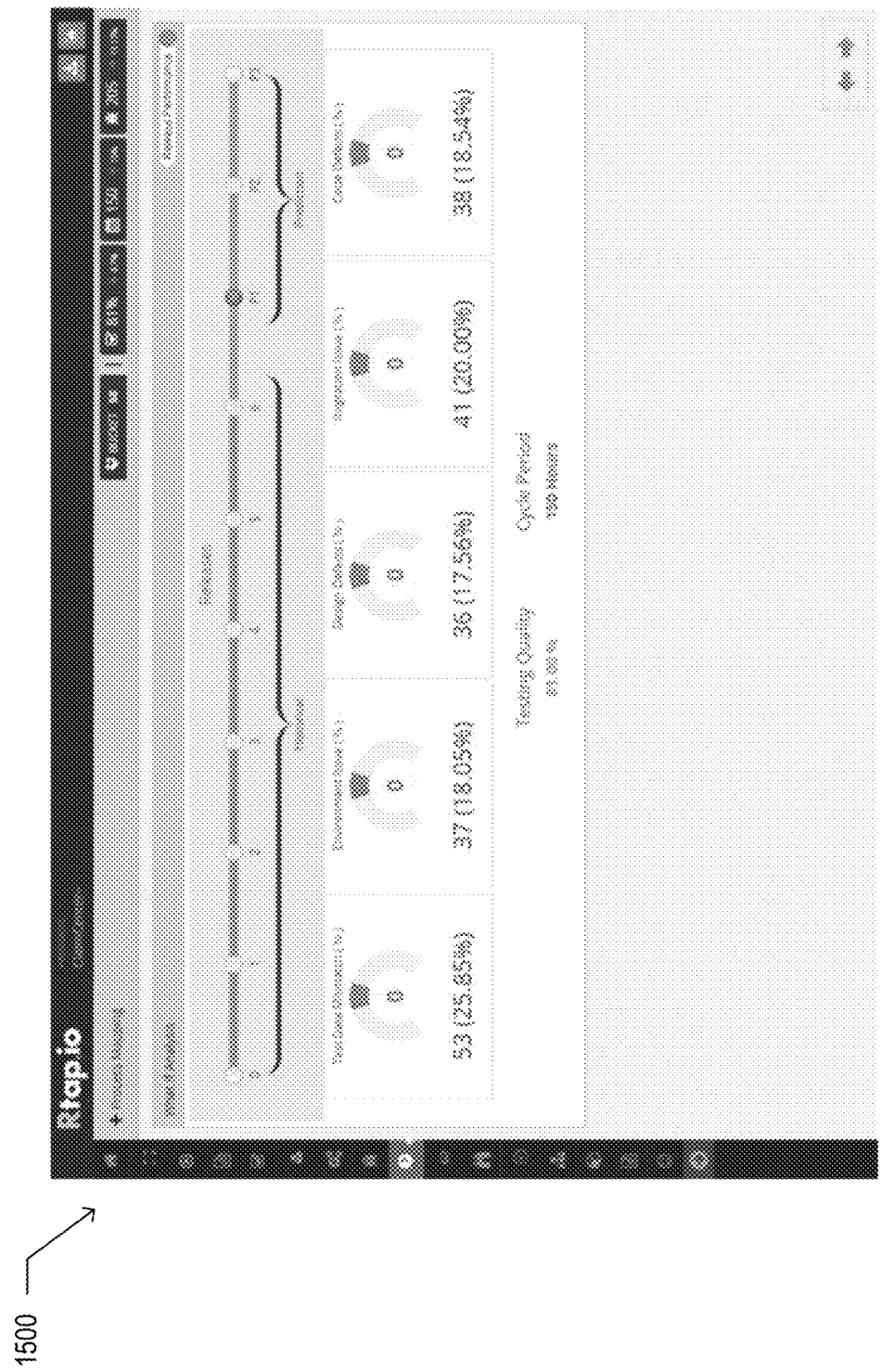

FIG. 15 shows an example of prediction information for what-if analysis, presented in an example UI 1500.

Sentiment Analysis

In this scenario, input data can include: unstructured data, such as information from social networks, user feedback, app store reviews, and so forth.

Features extracted can include: a sentiment from each comment.

The ML algorithms applied to train a model can include: NLP.

The output predictions can include: sentiments predicted for future releases.

In this scenario, implementations may provide the following benefits: better understanding of user feedback with respect to product enhancements.

Sentiment analysis can be used to determine the user feedback and understand the user expectations. Any suitable source and type of unstructured data can be used for this analysis, with NLP employed to extract sentiment from the data. Sentiment analysis can help a team to understand the particular feedback from end-users. The team can understand the expectations from the product, application, and/or service to further improve the same.

Figure 16:
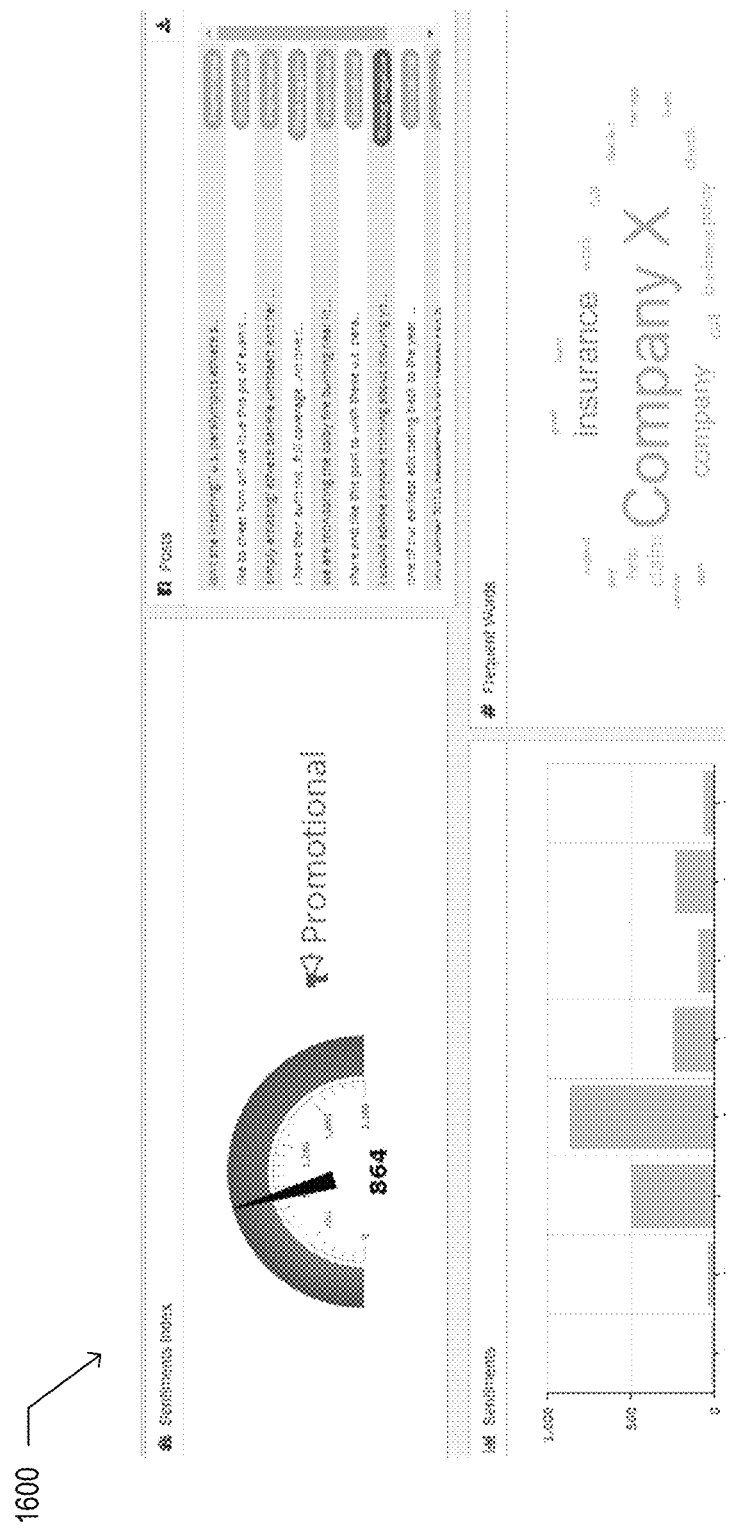

FIG. 16 shows an example of prediction information for sentiment analysis, presented in an example UI 1600.

AI for Testing

In this scenario, input data can include: SDLC data captured from various development and testing applications in a suitable templated format, as well as information regarding release, test cycle, requirements, development, test cases, test execution, defects, and so forth.

Features extracted can include any of the features described above.

The ML algorithms applied to train a model can include: suitable regression, classification, and/or clustering algorithms, along with descriptive analytics for pattern recognition.

The output predictions can include: a dashboard showing the above features, analyses, and/or predictions.

In this scenario, implementations provide the following benefits: a complete end-to-end flow, e.g., without user intervention, providing all the benefits from the above-mentioned features.

In some implementations, AI for testing is an application using the platform as an end-to-end process. The flow for AI for testing can include: ingestion, data preparation, feature extraction, model training, prediction, and/or visualization. For ingestion, templates can be created for various data points such as requirements, development, code quality, test cases, test execution, and defects. After populating the data in the templated formats, a user may create a project and select the SDLC analysis as an application. A wizard may be executed asking the user to upload the extracted data. Once the data is uploaded, various operations (e.g., data preparation, feature extraction, model creation, prediction, visualization, and/or dashboard creation) can be performed in the background. At the end, a finished dashboard may be prepared which can be accessed by the user. Algorithms used may include those described above.

Figure 17:
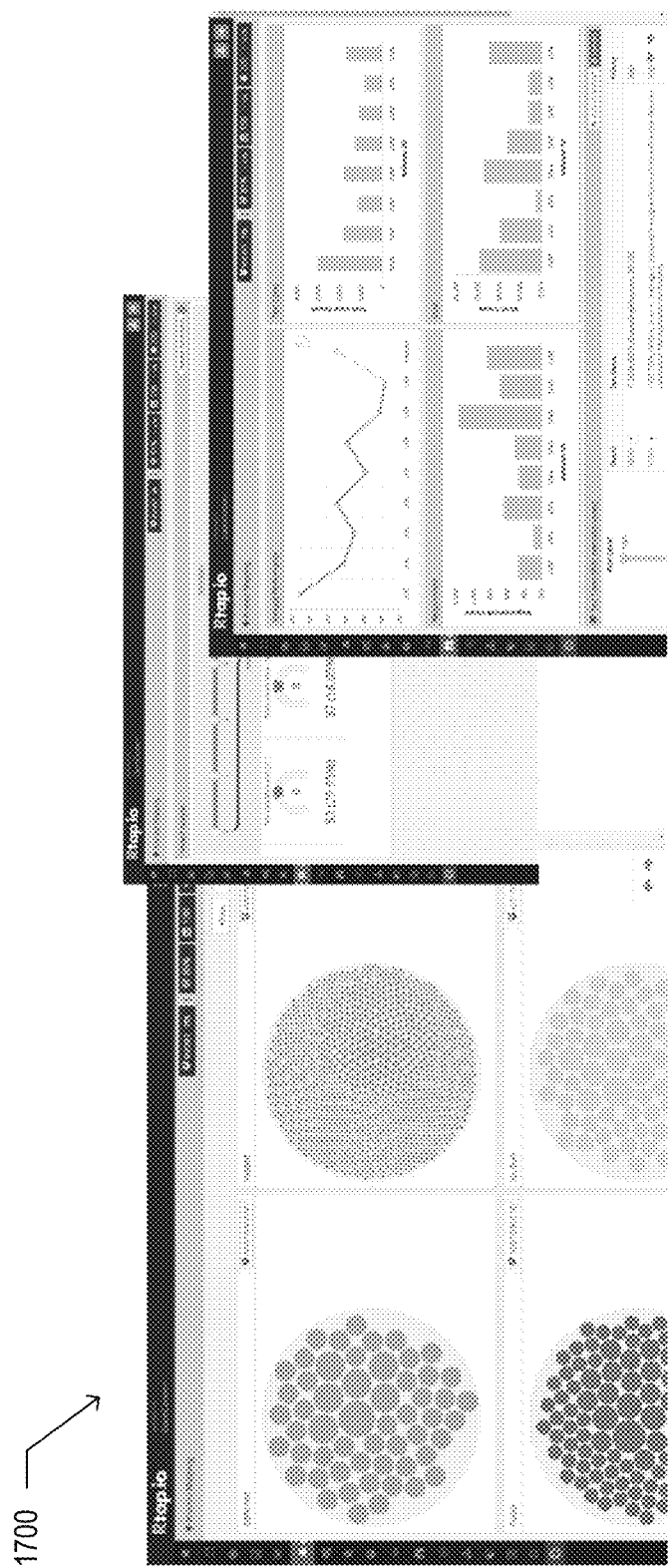

FIG. 17 shows an example of prediction information for AI for testing, presented in an example UI 1700.

Figure 5:
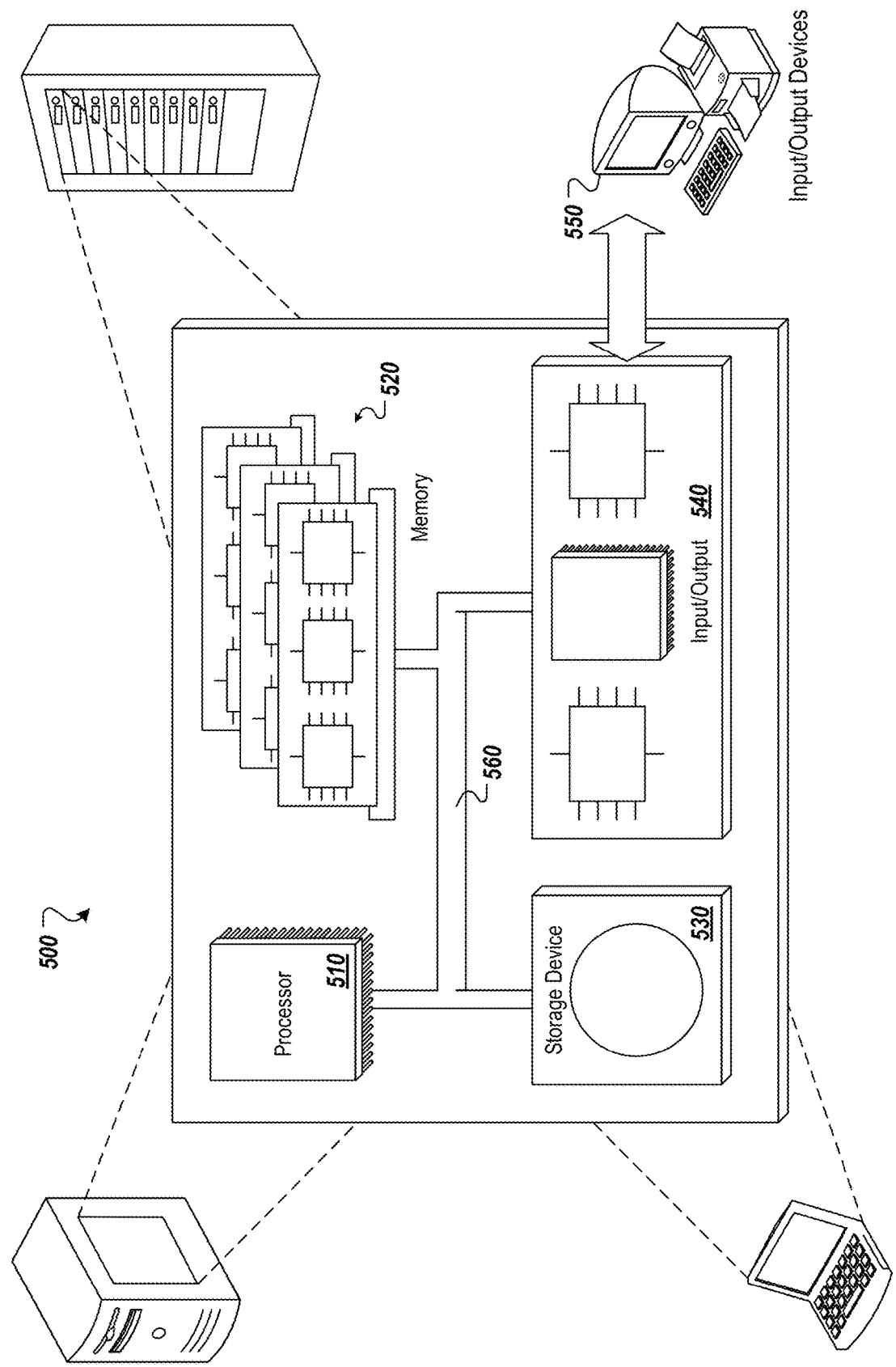
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the prediction computing device(s) 102, the output computing device(s) 118, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   receiving, by the at least one processor, input data that describes a plurality of prior software development projects;
   analyzing, by the at least one processor, the input data to extract a plurality of features that characterize each of the prior software development projects, wherein the plurality of features for a respective prior software development project includes a feature indicating a number of defects present, at release time, in respective software produced through the respective prior software development project;
   training, by the at least one processor and using the plurality of features and at least one machine learning (ML) algorithm, a model that predicts the number of defects based on one or more input features, the training comprising providing, as input to the model and for each of the prior software development projects, the plurality of features that includes the feature indicating the number of defects present, at release time, in respective software produced through the respective prior software development project;
   employing, by the at least one processor, the model to predict the number of defects present, at release time, in software produced through a subsequent software development project; and
   providing, by the at least one processor, prediction information for presentation through a user interface, the prediction information including the predicted number of defects.

2. The method of claim 1, wherein the plurality of features for a software development project includes one or more of:
   a number of requirements for the software produced through the software development project;
   a complexity of each of the requirements;
   a number of lines of code for the software;
   a code quality for the code;
   a number of modules in the software;
   a number of pages in the software;
   a number of functions in the software; and
   a skill index for one or more developers on the software development project.

3. The method of claim 1, wherein the at least one ML algorithm includes one or more of a regression algorithm, a time series algorithm, an autoregressive integrated moving average (ARIMA) algorithm, a support vector machine (SVM) algorithm, and a deep learning algorithm.

4. The method of claim 1, further comprising:
   evaluating, by the at least one processor, the model through k-fold evaluation.

5. The method of claim 1, wherein the input data describes at least one prior software development project to develop a previous version of software to be produced through the subsequent software development project.

6. The method of claim 1, further comprising:
   retraining, by the at least one processor, the model to generate a retrained model using the at least one ML algorithm, based on additional input data that describes at least one other software development project;
   comparing, by the at least one processor, a first accuracy of the model with a second accuracy of the retrained model; and
   employing, by the at least one processor, a higher accuracy model from the model and the retrained model that has the higher accuracy to predict the number of defects present, at release time, in software produced through a second subsequent software development project.

7. The method of claim 1, further comprising:
   automatically performing, by the at least one processor, at least one testing operation to test the software based on the prediction information that includes the predicted number of defects that were predicted by the model for the subsequent software development project.

8. The method of claim 1, wherein the input data includes technical information that describes the software.

9. The method of claim 1, comprising:
   determining whether a quantity of first input data for a first software development project satisfies a threshold quantity, wherein the first software development project comprises an earlier release of the subsequent software development project; and
   in response to determining that the quantity of first input data for the first software development project does not satisfy the threshold quantity, retrieving the input data that describes two or more prior software development projects including the first software development project.

10. A system comprising:
    at least one processor; and
    a memory communicatively coupled to the at least one processor, the memory storing instructions which, when executed, cause the at least one processor to perform operations comprising:
    receiving input data that describes a plurality of prior software development projects;
    analyzing the input data to extract a plurality of features that characterize each of the prior software development projects, wherein the plurality of features for a respective prior software development project includes a feature indicating a number of defects present, at release time, in respective software produced through the respective prior software development project;
    training, using the plurality of features and at least one machine learning (ML) algorithm, a model that predicts the number of defects based on one or more input features, the training comprising providing, as input to the model and for each of the prior software development projects, the plurality of features that includes the feature indicating the number of defects present, at release time, in respective software produced through the respective prior software development project;
    employing the model to predict the number of defects present, at release time, in software produced through a subsequent software development project;
    retraining the model to generate a retrained model using the at least one ML algorithm, based on additional input data that describes at least one other software development project;

comparing a first accuracy of the model with a second accuracy of the retrained model; and employing a higher accuracy model from the model and the retrained model that has the higher accuracy to predict the number of defects present, at release time, in software produced through a second subsequent software development project; and providing prediction information for presentation through a user interface, the prediction information including the predicted number of defects.

11. The system of claim 10, wherein the plurality of features for a software development project includes one or more of:

a number of requirements for the software produced through the software development project;

a complexity of each of the requirements;

a number of lines of code for the software;

a code quality for the code;

a number of modules in the software;

a number of pages in the software;

a number of functions in the software; and a skill index for one or more developers on the software development project.

12. The system of claim 10, wherein the at least one ML algorithm includes one or more of a regression algorithm, a time series algorithm, an autoregressive integrated moving average (ARIMA) algorithm, a support vector machine (SVM) algorithm, and a deep learning algorithm.

13. The system of claim 10, the operations further comprising:

evaluating the model through k-fold evaluation.

14. The system of claim 10, wherein the input data describes at least one prior software development project to develop a previous version of software to be produced through the subsequent software development project.

15. One or more computer-readable storage media storing instructions which, when executed, cause at least one processor to perform operations comprising:

receiving input data that describes a plurality of prior software development projects;

analyzing the input data to extract a plurality of features that characterize each of the prior software development projects, wherein the plurality of features for a respective prior software development project includes a feature indicating a number of defects present, at release time, in respective software produced through the respective prior software development project;

training, using the plurality of features and at least one machine learning (ML) algorithm, a model that predicts the number of defects based on one or more input features, the training comprising providing, as input to the model and for each of the prior software development projects, the plurality of features that includes the feature indicating the number of defects present, at release time, in respective software produced through the respective prior software development project;

employing the model to predict the number of defects present, at release time, in software produced through a subsequent software development project; and providing prediction information for presentation through a user interface, the prediction information including the predicted number of defects.

16. The one or more computer-readable storage media of claim 15, wherein the plurality of features for a software development project includes one or more of:

a number of requirements for the software produced through the software development project;

a complexity of each of the requirements;

a number of lines of code for the software;

a code quality for the code;

a number of modules in the software;

a number of pages in the software;

a number of functions in the software; and a skill index for one or more developers on the software development project.

17. The one or more computer-readable storage media of claim 15, wherein the at least one ML algorithm includes one or more of a regression algorithm, a time series algorithm, an autoregressive integrated moving average (ARIMA) algorithm, a support vector machine (SVM) algorithm, and a deep learning algorithm.

18. The one or more computer-readable storage media of claim 15, the operations further comprising:

evaluating the model through k-fold evaluation.

19. The one or more computer-readable storage media of claim 15, wherein the input data describes at least one prior software development project to develop a previous version of software to be produced through the subsequent software development project.

20. The one or more computer-readable storage media of claim 15, the operations further comprising:

retraining the model to generate a retrained model using the at least one ML algorithm, based on additional input data that describes at least one other software development project;

comparing a first accuracy of the model with a second accuracy of the retrained model; and employing a higher accuracy model from the model and the retrained model that has the higher accuracy to predict the number of defects present, at release time, in software produced through a second subsequent software development project.

* * * * *